United States Patent
Santamaria Razo et al.

(10) Patent No.: US 9,360,065 B2
(45) Date of Patent: Jun. 7, 2016

(54) GALVANIC PROTECTION CIRCUIT FOR A BRAKE DISC-PAD UNIT FOR A MOTOR VEHICLE AND KIT AND METHOD THEREOF

(71) Applicant: ITT ITALIA S.r.l., Lainate (IT)

(72) Inventors: Diego Adolfo Santamaria Razo, Barge (IT); Marco Travet, Barge (IT)

(73) Assignee: ITT ITALIA S.r.l. (IT)

( * ) Notice: Subject to any disclaimer, the term of this patent is extended or adjusted under 35 U.S.C. 154(b) by 32 days.

(21) Appl. No.: 14/202,695

(22) Filed: Mar. 10, 2014

(65) Prior Publication Data

US 2014/0251823 A1 Sep. 11, 2014

(30) Foreign Application Priority Data

Mar. 8, 2013 (IT) .............................. TO2013A0188

(51) Int. Cl.
| | |
|---|---|
| C23F 13/00 | (2006.01) |
| F16D 65/00 | (2006.01) |
| B60T 17/22 | (2006.01) |
| C23F 13/04 | (2006.01) |

(52) U.S. Cl.
CPC ........... *F16D 65/0025* (2013.01); *B60T 17/221* (2013.01); *C23F 13/04* (2013.01); *C23F 2213/30* (2013.01)

(58) Field of Classification Search
CPC .......... C23F 13/02; C23F 13/06; C23F 13/10; C23F 13/22; C23F 2213/20; C23F 2213/30; F16D 65/0025; F16D 65/00
USPC ............... 204/196.01, 196.02–196.07, 196.1, 204/196.17, 196.21, 196.28, 196.3, 196.36
See application file for complete search history.

(56) References Cited

U.S. PATENT DOCUMENTS

2007/0296355 A1* 12/2007 Hamamoto .......... H05B 41/295
  315/309
2014/0027212 A1* 1/2014 Nishida ................... B60T 17/22
  188/17

FOREIGN PATENT DOCUMENTS

| FR | 2 815 040 A1 | 4/2002 |
|---|---|---|
| KR | 2011-0043849 A | 4/2011 |

OTHER PUBLICATIONS

International Search Report/Written Opinion for IT TO20130188; (7 pages).

* cited by examiner

*Primary Examiner* — Luan Van
*Assistant Examiner* — Alexander W Keeling
(74) *Attorney, Agent, or Firm* — Barclay Damon, LLP

(57) ABSTRACT

An active corrosion protection circuit for a brake disc-pad unit of a motor vehicle includes one of a metal disc and a pad adapted to selectively block the disc. A direct electric voltage source and an electric conductor connectable to the electric voltage source and one of the disc and the pad forms an electric circuit causing a monopolar current flux between the disc and the pad when the pad blocks the disc so that the action of the current is localized in a contact zone between the disc and the pad.

12 Claims, 1 Drawing Sheet

GALVANIC PROTECTION CIRCUIT FOR A BRAKE DISC-PAD UNIT FOR A MOTOR VEHICLE AND KIT AND METHOD THEREOF

CROSS REFERENCE TO RELATED APPLICATION

This application is based upon Italian Patent Application No. TO2013A 000188, filed Mar. 8, 2013, under relevant sections of 35 USC §119, the entire contents of which are hereby incorporated by reference.

TECHNICAL FIELD

The present invention relates to a galvanic protection circuit for a brake disc-pad unit for a motor vehicle and upgrade kit and protection method thereof.

BACKGROUND OF THE INVENTION

A disc brake system of a motor vehicle is used to slow down the speed of the vehicle, or during parking to maintain the position, especially when the motor vehicle is parked uphill or downhill and the user exits the driver's seat.

During parking, a pad supported by a caliper or brake shoe fixed to the vehicle chassis is brought into contact with a rotating metal disc fixed to a type of the motor vehicle and applies a load, preferably constant, upon the disc itself. In particular, when the disc brake operates as a parking brake, it may happen that during a long or even very long stop in a moist or particularly wet environment electrochemical phenomena of corrosion start, in particular on the interface of the disc with the pad. This involves a corrosion impression which tends to damage the disc and causes adhesion between the friction material of the pad and the disc that can prevent the detachment and therefore blocks the vehicle in the parking position.

It was found that the corrosion and adhesion are higher when the friction material comprises powders with low or no metal content and high amounts of thermosetting polymeric materials. Said drawback is particularly felt since the current regulations provide the use of friction materials comprising polymer powders which are proving to be more ecological compared to conventional friction powders, for example those made of copper powder.

SUMMARY OF THE INVENTION

The purpose of the present invention is to provide a circuit to protect the disc-pad unit from corrosion.

The purpose of the present invention is achieved by a circuit, a kit and a method according to the claims.

BRIEF DESCRIPTION OF THE DRAWINGS

The invention will now be described with reference to the accompanying drawings, which illustrate examples of non-limiting embodiments, of which.

DETAILED DESCRIPTION OF THE INVENTION

Figure 1:
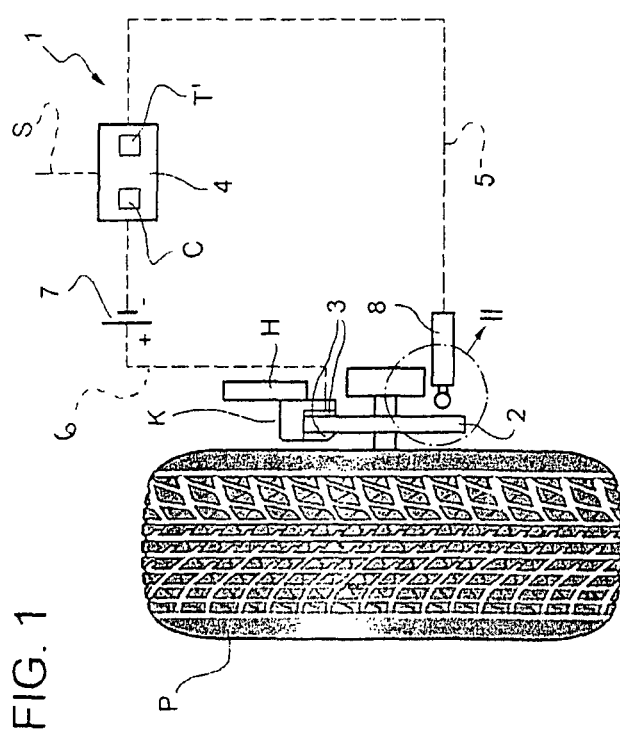
FIG. 1 shows schematically a galvanic protection circuit for a disc-pad unit according to the present invention.

In FIG. 1 is illustrated with 1 as a whole an active galvanic protection circuit for a disc 2 and a pad 3 controlled by a caliper K of a braking circuit of a motor vehicle. In particular, the disc 2 and the pad 3 are made of materials that conduct electricity, for example the brake disc is metallic and the pad 3 comprises a metal plate and a friction layer electrically conductive fixed on the metal plate. The circuit can be made as a kit to be mounted on a vehicle not originally equipped for the galvanic protection of the disc 2 and of the pad 3 or may be already provided as an original equipment of the motor vehicle.

According to one embodiment of the present invention, the galvanic protection circuit 1 comprises an electric conductor 5 for connecting the disc 2 to the negative pole of an electric voltage source 7 and a control unit 4 for controlling the electric voltage applied to the disc 2 in some operating conditions, for example when the caliper blocks the disc 2. According to a further embodiment, the negative pole of the direct electric voltage source 7 is connected to the pad 3 and the disc 2 is either grounded or connected to the positive pole of the direct electric voltage source 7. It was verified that the appropriate polarity to prevent corrosion between the friction material of the pad 3 and the disc 2 depends on the composition of the friction material itself. In particular, when the disc 2 is of cast iron, a support of the pad 3 is made of steel or also of a steel alloy, if the friction material deposited on the support comprises iron, copper, zinc and brass (e.g. 10, 5, 2 and 2%, respectively) for preventing rather than promoting corrosion is necessary to reverse the polarity and connect the caliper to the negative pole 2. It has been found that it is necessary to act in this way when the total percentage by weight of all the metal powders exceeds about 15% by weight of the composition of the friction material.

Conveniently, also the other circuit element has an electric connection to allow the passage of current in the contact zone between disc 2 and caliper 3. For example, if the disc 2 is connected to the negative pole, the pad 3 is electrically connected to the positive pole of the battery or to a chassis H of the vehicle or grounded by way of a conductor 6. The conductor 6 is preferably a wire connected between the pad 3 and the chassis H or the battery 7 when the pad 3 is mounted on its own caliper by means of an electrically insulating material. Said material is for example a polymer layer inserted between the support of the pad 3 and the caliper to reduce vibration or noise. This polymer layer electrically insulates the pad 3 from the chassis H of the vehicle. Alternatively, the conductor 6 is any electrically conductive element, even an element with additional functions such as the caliper K, which connects the pad 3 to the chassis H. Furthermore, most of the powder mixtures which constitute the friction material of the pad 3 are considered to be an electric conductor for the purposes of the galvanic protection, by virtue of the presence of conductive powders made of graphite or metals or metal alloys. More in particular, the layer of friction material defines a conductor having an electric resistance higher than 500 Ohms, very often higher than 1000 Ohms, depending on its composition and said electric resistance allows to balance the current in the circuit 1 at optimal values. It was also verified that said level of electric resistance is achieved by the layer of friction material after a transient of variable duration from a few minutes to tens of minutes after the exposure to water, for example after crossing a puddle, or after exposure to a saline solution that can generate in the winter when the roads are treated with de-icing substances.

According to the present invention, the control unit 4 comprises a timer C, and a control device T' that regulates the voltage applied to the disc 2 and, conveniently, also the current circulating through the disc 2-pad 3 unit, and receives as input a control signal S to activate and deactivate the current.

Figure 3:
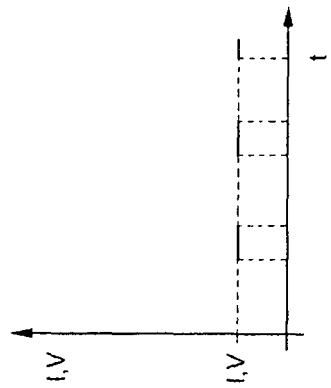
FIG. 3 shows an intermittent voltage or current applied to the circuit of FIG. 1.

In particular, the timer C times or is configured for timing intermittently the voltage and the current in a suitable manner, according to the control signal S. The voltage or electric current applied to the disc 2 is monopolar, i.e. does not change polarity, and is preferably direct i.e. generated by a battery and/or maintains a constant level except for transients. According to the present invention, the voltage or the current is intermittent, in the sense that it follows also variable frequency cycles (FIG. 3). Each cycle has at least a step in which the voltage or the current is at a first level and at least one further step in which the voltage or the current is at a second level higher than the first level. Preferably, the first level of voltage or current is zero in order to preserve the charge of the electric voltage source 7 which suitably comprises the motor vehicle battery.

It was verified that the duration of the higher voltage or current step may be shorter than the lower or zero voltage or current step without compromising the effectiveness of the anticorrosive effect. The duration of the higher voltage or current step of each cycle is higher than at least three times the duration of the lower or zero voltage or current step. Good results were also obtained with cycles wherein the ratio is higher than 10.

Furthermore, the frequency of the cycles are preferably low and less than 1 cycle per hour. In particular, when the control unit 4 receives the control signal S, the first cycle starts preferably with the first step. Furthermore, the control unit 4 may develop a signal indicative of the level of the charge of the battery 7 and stop automatically the intermittent voltage or current when the charge level of the battery 7 decreases below a predefined threshold.

The control unit 4 can also program the value of the voltage or current levels according to a stored database, which associates to each composition of friction material of the pad 3 a cycle of intermittent voltage or current in relation to the duration and/or to the levels of voltage or current. In tests wherein the disc 2 is of cast iron and the support of the pad 3 is made of steel it has been in fact verified that, when the friction material of the pad 3 does not comprise metal powders and has graphite powders and thermosetting polymeric materials, similar effects to counteract the adhesion between pad 3 and disc 2 are obtained with a level of voltage or current lower than the level of voltage or current required when the friction material comprises increasing percentages of metallic powders or with metal alloy base. Moreover, it was verified that at equal protection against the adhesion between pad 3 and disc 2, the required current level increases with the percentage by weight of metal powder in the friction material carried by the pad 3. In this regard, in order to obtain an anti-corrosion effect it may also be necessary to reverse the polarity between disc 2 and pad 3.

A method for verifying the effectiveness of the action of the circuit 1 comprises a first step during which the disc 2-pad 3 unit is operated in a predefined load condition, for example that corresponding to the function of the parking brake, and is exposed to the environmental conditions of moisture and a possibly aggressive environment (solution of salts or other substances) that favor corrosion of the disc 2 and the adhesion between the friction surface of the pad 3 and the disc 2. In a second step the load on the disc 2-pad 3 unit is released and is preferably measured in a continuous way the torque applied between disc 2 and pad 3 to obtain a relative rotation in the absence of pressure between disc 2 and pad 3.

In relation to this test it was verified that, all other conditions being equal, the level of current measured in amperes which must be applied to the disc 2-pad 3 unit to keep the maximum value of measured torque constant to obtain the relative rotation increases proportionately with the percentage of metal powders or comprising metal alloys in the friction layer of the pad 3.

It was also verified in the case of cast iron discs 2 and steel support of pad 3 that also in the case of friction materials currently used and comprising the higher percentage of metal powders or metal alloys in any case low levels of detachment maximum torque are measured when through the disc 2-pad 3 unit an intermittent current circulates with a maximum level lower than 0.9 amperes, preferably less than 0.6 amperes. The maximum level of the intermittent current is instead lower than 0.3 amperes when the friction layer of the pad 3 has a percentage in weight of metal powders not less than 90%. When the friction material does not comprise metal powders or metal alloys, the level of current that ensures a proper protection against corrosion is less than 0.1 amperes.

Tests were carried out with pads having the following friction materials:

A composition: 1% aramid fiber, 12% phenolic resin, 17.6% chromite, 6.5% tin sulfide, 14.4% barite, 7% aluminum oxide, 15.5% graphite, 20% iron, 5% copper, 1% rubber (percentage of metal powders higher than 15%);

B composition: 3% aramid fiber, 9.5% phenolic resin, 15% chromite, 8% tin sulfide, 23.5% barite, 10% potassium titanate, 4% graphite, 17% zirconium oxide, 4% copper, 6% iron (percentage of metal powders of 10%);

C composition: 3% aramid fiber, 10% phenolic resin, 15% chromite, 10% tin sulfide, 24% barite, 12% potassium titanate, 6% graphite, zirconium oxide 20% (composition without metal powders).

The materials of the metal plate of the pad 3 used during the tests are called S275JR (according to EN10025) and S420MC (according to EN10149).

According to the present invention, the control unit 4 controls the beginning of the cycles of intermittent current according to the control signal S which can for example refer to the insertion of the parking brake, i.e. the pad 3 blocks the disc 2 when the vehicle is stationary, the engine is switched off by the user by way of the key and, in the case of long stops, the user is not present in the vehicle and/or the vehicle doors are closed and locked. The mode of the parking brake can be switched off in various ways: either manually and directly by the user by pressing a switch inside the cockpit or automatically as a result of a user action, such as the actuation of the brake pedal or the engagement of a gear. When the parking brake mode is switched off, the control unit 4 stops the application of intermittent voltage or current by way of the disc 2-pad 3 unit.

Figure 2:
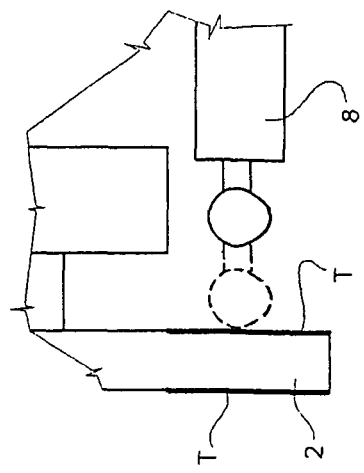
FIG. 2 shows an enlarged detail of FIG. 1.

According to the embodiment of FIG. 1, the circuit 1 also comprises an actuator 8 for selectively connecting the disc 2 to the battery 7. The actuator 8 is movable between an opening position in which the circuit 1 is open, and a contact position (dashed line in FIG. 2) in which the disc 2 is connected to the negative pole of the battery 7: therefore the disc 2 is connected selectively and not permanently to the respective pole of the battery 7. For example, in the contact position, the conductor 5 contacts either the disc 2 or another element rotationally rigid with respect to a type P of the motor vehicle and that can apply a voltage or an electric current by way of the disc 2 when the circuit 1 is closed. The point of electric contact between disc 2 and conductor 5 is conveniently placed on the periphery of the disc 2, where the friction material of the pad 3 forms after use a track T on the disc 2. Said track T is in fact a relatively clean surface of the disc 2 due to the use and the electric contact is therefore favoured.

Preferably, the actuator 8 is controlled by the control unit 4 and must connect the disc 2 to the respective pole of the battery 7 at least when the second step of the first cycle of intermittent voltage or current starts. Preferably, the disc 2 remains connected to the corresponding pole of the battery 7 by means of the actuator 8 until the control unit 4 receives a signal to interrupt the intermittent voltage or current. Alternatively, the switching between the opening position and the contact position and vice versa, respectively defines the beginning and the end of the higher voltage or current step of each cycle of intermittent voltage or current.

Preferably, the pad 3 is instead permanently connected to the other pole of the battery 7 so that the electric current can pass through the contact zone between the disc 2 and the pad 3 when the pad 3 blocks the disc 2.

The operation of the circuit 1 is as follows.

The intermittent voltage applied to the disc 2 is able alone to slow or cancel the corrosion reactions that are generated on the disc 2 in an aggressive environment such as defined by water which possibly contains in solution saline substances. To obtain the anticorrosive effect it was verified that is important the amount of charges that reaches the disc 2. The protective effect is little influenced or uninfluenced by the manner wherein the charges reach the disc 2, i.e. by the frequency and in general by the distribution in time with which the charges reach the disc 2. Furthermore, both the disc 2 and the pad 3 are polarized so that the electric current is induced to cross the interface between the disc 2 and the friction material of the pad 3. In this way, the action of the current is localized in the region where corrosion is most active.

The electric charge induced by the direct electric voltage source 7 is such as to counteract the corrosive action without appreciably degrading the components of the electric circuit, i.e. disc 2 and pad 3.

The advantages of the circuit 1 according to the present invention are the following.

When both the disc 2 and the pad 3 act as electrodes of the electric circuit, the anticorrosive action is localized in the most critical zone to counteract the pad 3 on the disc 2, i.e. the contact region between the friction material of the pad 3 and the disc 2. Furthermore, it is not necessary to provide a specialized sacrificial electrode and possibly to be replaced during the useful life of the motor vehicle: no component degrades appreciably during the useful life of the vehicle 1 when the electric current passes through the interface between the disc 2 and the pad 3.

By way of an intermittent voltage or current, the electricity consumed for protection from corrosion can be limited considerably and thus preserve battery life 7.

Furthermore, it is possible that the disc 2 and the pad 3 are produced by different companies so that the circuit can be obtained by means of the control unit 4, the electric conductor 5 and optionally the pad 3 and/or the actuator 8, without including the disc 2.

For the same purpose it was verified that satisfactory results are obtained when:
- the duration of the step at a higher current level is lower than that of the step at zero current or with a low current level;
- the frequency of the cycles is low so as to avoid the dissipation of energy due to transients;
- the maximum current level is lower than 0.9 amperes regardless of the content of metal powders and metal alloys of the friction material of the pad 3, or lower than 0.1 amperes when the friction material does not comprise metal powders and metal alloys;
- the first step of the cycle when the electric current is applied to the disc 2 and the pad 3 has a low or null level to allow the level of the electric resistance defined by the friction layer of the pad 3 to stabilize.

The actuator 8 can be used in particular when the circuit 1 is provided as a retrofit and not as an original equipment. In addition, by way of the actuator 8 the circuit is reliable and requires minimal maintenance and is easy to perform since the intermittent current circulates only when the disc 2-pad 3 unit is stationary: are thus not provided surfaces in contact and in relative motion.

Finally it is clear that to the galvanic protection circuit 1 here described and illustrated it is possible to make modifications or variations without departing from the scope of protection as defined by the appended claims.

For example, in particular where the circuit 1 is provided as an original equipment for the system of a motor vehicle, the wheel hub can be specially designed so that the disc 2 is connected to the corresponding pole of the battery 7 or grounded depending on the metal of the disc 2 and on the materials of the pad 3, for example, by way of an electrically conductive rolling bearing, comprising a stator ring connected permanently or releasably to the conductor 5 and a rotor ring electrically connected to the disc 2, the electric connection between the bearing rings being obtained by, for example, the rolling bodies. In this configuration, the circuit 1 comprises a switch controlled by the control unit 4 so that the intermittent current circulates according to the control signal S sent to the control unit 4 and not simply each time the pad 3 contacts the disc 2.

When the circuit 1 is provided as an original equipment, the control unit 4 can be incorporated in the control unit of the motor vehicle and in particular the combustion engine of the vehicle, which controls the intermittent current that passes through the disc 2-pad 3 unit according to the control signal S.

The connection of the disc 2 or of the pad 3 to the positive or negative pole of the battery 7 and the current depends on the size and on the material of the disc 2 and of the pad 3.

Generally in a vehicle the positive pole of the battery is connected to ground by means of the vehicle chassis H.

Advantageously, the level of voltage or current is constant during all application cycles of the anti-corrosion action, as illustrated in FIG. 3.

In particular, when the content of metal powder by weight of the friction material of the pad 3 is more than 15% it is necessary to connect the pad 3 to the negative pole of the electric voltage source 7 and the disc 2, which is normally grounded by means of the chassis, does not require a connection to the battery and, also in this case, the presence of the actuator 8 is not necessary.

Normally each caliper K actuates a pair of opposing pads 3 and the circuit 1 can be applied to only one or both pads 3 of the caliper K.

The invention claimed is:

1. An active corrosion protection circuit for a brake disc-pad unit of a motor vehicle comprising:
   one of a metal disc and a pad adapted to selectively block said disc;
   a direct electric voltage source and an electric conductor connected to said direct electric voltage source and one of said metal disc and pad, so as to form an electric circuit causing a monopolar current flux between said metal disc and said pad when said pad blocks said metal disc, so that the action of the current is localized in a contact zone between said metal disc and said pad;
   a control unit, which controls the current based on a control signal indicative of contact between the metal disc and the pad; and in which the control unit is programmed to apply either a monopolar electric voltage to said one of the metal disc and the pad, or a monopolar current in the contact zone between the metal disc and the pad upon receipt of the control signal indicative of contact between the metal disc and the pad, the monopolar electric voltage or the monopolar voltage being applied intermittently during the time that the control signal is received, wherein the intermittent application of the voltage or current preserves the life of the direct electric voltage source.

2. The circuit according to claim 1, wherein said control signal refers to a parking brake applied condition.

3. The circuit according to claim 1, further comprising an actuator controlled by said control unit and selectively movable between an opening position and a contact position in which said disc is adapted to be electrically connected to said voltage source.

4. The circuit according to claim 3, wherein said actuator connects a periphery of said metal disc to said direct electric voltage source by means of a contact created by a track formed by the pad in use on said disc, said track providing a relatively clean surface.

5. The circuit according to claim 1, wherein said control unit applies said monopolar, intermittent voltage or current according to at least one cycle upon receipt of the control signal, the at least one cycle being defined by a first level and a second level, in which the magnitude of the monopolar current or monopolar voltage of the second level is significantly higher than the monopolar current or monopolar voltage of the first level.

6. The circuit according to claim 5, the at least one cycle begins with the monopolar voltage or monopolar current at the first level and in which the current or voltage at the first level is equal to zero.

7. The circuit according to claim 5, wherein the control unit controls the duration of the monopolar current or monopolar voltage applied at the first level, the first level duration being shorter than the duration of the monopolar current or voltage applied at the second level.

8. The circuit according to claim 5, wherein the duration of said at least one cycle lasts more than 1 hour.

9. The circuit according to claim 5, wherein said control unit applies the monopolar, intermittent voltage or current by selecting said second level according to stored data about the composition of a friction material of said pad.

10. The circuit according to claim 5, wherein said second level is a current level lower than 0.5 amperes.

11. The circuit according to claim 1, further comprising another electric conductor configured to ground said pad or to connect said pad to said direct electric voltage source.

12. A kit for the active corrosion protection of a disc-pad unit of a motor vehicle, comprising:
- an electric conductor adapted to connect one of said disc or said pad to an electric voltage source or to ground one of said disc or said pad;
- an actuator selectively movable between an opening position and a contact position in which said disc is electrically connected to said voltage source by applying either an electric voltage or an electric current;
- a control unit which controls said actuator in said contact position to apply, according to a control signal, a monopolar electric voltage or current and cause a current flux between said disc and said pad when said pad blocks said disc, so that the action of the current is localized in a contact zone between said disc and said pad.

* * * * *